United States Patent
Horner et al.

(10) Patent No.: US 10,430,393 B2
(45) Date of Patent: Oct. 1, 2019

(54) GENERATING A DATABASE STRUCTURE FROM A SCANNED DRAWING

(71) Applicant: International Business Machines Corporation, Armonk, NY (US)

(72) Inventors: Samuel S. Horner, Milton Keynes (GB); Liam A. White, Reading (GB)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 14/799,614

(22) Filed: Jul. 15, 2015

(65) Prior Publication Data

US 2016/0034501 A1    Feb. 4, 2016

(30) Foreign Application Priority Data

Jul. 29, 2014  (GB) .................................. 1413384.7

(51) Int. Cl.
*G06F 17/30* (2006.01)
*G06F 16/21* (2019.01)
*G06K 9/00* (2006.01)

(52) U.S. Cl.
CPC ........ *G06F 16/211* (2019.01); *G06K 9/00469* (2013.01)

(58) Field of Classification Search
CPC ......... G06F 17/30289; G06F 17/30292; G06F 17/30294; G06F 17/30575; G06F 16/21; G06F 16/211; G06F 16/212; G06F 16/213; G06K 9/00469
USPC .................................................. 707/802–808
See application file for complete search history.

(56) References Cited

U.S. PATENT DOCUMENTS

| | | | |
|---|---|---|---|
| 5,930,799 A | 7/1999 | Tamano et al. | |
| 6,247,018 B1 | 6/2001 | Rheaume | |
| 2004/0133581 A1* | 7/2004 | Shinjo | G06F 17/30569 |
| 2006/0085470 A1 | 4/2006 | Schmitt et al. | |
| 2009/0132995 A1* | 5/2009 | Iborra | G06F 8/30 717/106 |
| 2009/0187296 A1* | 7/2009 | James | B61L 23/14 701/19 |
| 2010/0223298 A1* | 9/2010 | Lam | G06F 17/30595 707/803 |
| 2010/0228764 A1* | 9/2010 | Sallakonda | G06F 17/3051 707/769 |
| 2013/0111375 A1 | 5/2013 | Frohliger | |

(Continued)

FOREIGN PATENT DOCUMENTS

JP       2003132078 A    5/2003

OTHER PUBLICATIONS

Qiu, "A New Database Notation Especially Designed for Hand Drawing", School of Software, Sun Yat-Sen Univ., http://www.academia.edu/4912763/A_New_Database_Notation_Especially_Designed_for_Hand_Drawing, Printed on Apr. 20, 2015, pp. 1-5.

(Continued)

*Primary Examiner* — Hares Jami
(74) *Attorney, Agent, or Firm* — Dmitry Paskalov

(57) ABSTRACT

A method of generating a database structure from a scanned drawing of a desired database structure is provided. The method comprises: processing the scanned drawing to identify features of the desired database structure; and implementing the identified features to generate the desired database structure.

15 Claims, 8 Drawing Sheets

(56) References Cited

U.S. PATENT DOCUMENTS

2014/0188928 A1* 7/2014 Singh et al. ...... G06F 17/30958
707/769

OTHER PUBLICATIONS

"Database Schema Drawing Tools", http://savage.net.au/Ron/html/drawing-tools.html, Printed on Apr. 20, 2015, pp. 1-10.
"Design and maintain databases visually", http://www.visual-paradigm.com/solution/dbdesign/, Printed on Apr. 20, 2015, 1 page.
GB Application No. 1413384.7, Filed on Jul. 29, 2014, entitled: "Generating a Database Structure From a Scanned Drawing", 27 pages.
GB Search Report, Application No. GB1413384.7, dated Jan. 13, 2015, pp. 1-3.
"DatabaseSpy Graphical Database Design Tool", Graphical Database Design, http://www.altova.com/databasespy/database-design.html, Printed on Apr. 20, 2015, 1 page.
"Oracle database design with Entity Relationship Diagram", Visual Paradigm, Tutorial, Written Date : Sep. 1, 2009, http://www.visual-paradigm.com/tutorials/oracledbdesignwitherd.jsp, pp. 1-6.
"ConceptDraw PRO 10", http://www.conceptdraw.com/products/drawing-tool/, Printed on Apr. 20, 2015, pp. 1-3.

* cited by examiner

TABLE C

| NAME | PK | FK | AI | |
|---|---|---|---|---|
| PROJID | 🔔 | ☐ | 🔔 | int |
| MODIFY | ☐ | ☐ | ☐ | |
| LACK | ☐ | ☐ | ☐ | |
| METAID | ☐ | 🔔 | ☐ | int |

Confirm

Fig. 5

TABt 2

| NAME | PK | FK | AI | |
|---|---|---|---|---|
| TORNRID | 🔔 | ☐ | ☐ | |
| EXTRA | ☐ | ☐ | ☐ | |
| MOD | ☐ | ☐ | ☐ | |
| TREAT | ☐ | ☐ | ☐ | |

Confirm

Fig. 6

TABLE B

| NAME | PK | FK | AI | |
|---|---|---|---|---|
| BID | 🔔 | ☐ | ☐ | |
| USERID | ☐ | 🔔 | ☐ | |
| PROJID | ☐ | 🔔 | ☐ | |
| CREATE | ☐ | ☐ | ☐ | |
| INSTAT | ☐ | ☐ | ☐ | int |
| TORNID | ☐ | 🔔 | ☐ | |

Confirm

Fig. 9

FK  REFERENCES  PK tablec.metaid    tabt3.metaid

+ Add another

Confirm

Fig. 10

GENERATING A DATABASE STRUCTURE FROM A SCANNED DRAWING

BACKGROUND

The present invention relates to generating a database structure from a scanned drawing, and more particularly by identifying and implementing features of the desired database structure found in the scanned drawing.

When teams are designing databases, there is a tendency to draw out a data model with simple relationships and information about each field in the data model. Each field in the data model may be represented as a column in the database structure. When the teams are creating a database from a data model, it can take a very long time to create the basics of the database structure. Typically, the database is created either using coding commands or filling out, perhaps hundreds of fields, in a Graphical User Interface (GUI) to create the basic layout of the database. Such prior art techniques require a large amount of time to create the basic structure of the database and mean that the development of code to interact with the database is delayed until this is completed. The problems identified above also apply to a scenario where a single person is designing the database.

SUMMARY

Embodiments of the invention provide a method of generating a database structure from a scanned drawing of a desired database structure, the method comprising the steps of: processing the scanned drawing to identify features of the desired database structure; and implementing the identified features to generate the desired database structure.

Embodiments of the invention also provide a system for generating a database structure from a scanned drawing of a desired database structure, the system comprising: a feature recognition module for processing the scanned drawing to identify features of the desired database structure; and a database structure generator for implementing the identified features to generate the desired database structure.

Embodiments of the invention also provide a computer program product for generating a database structure from a scanned drawing of a desired database structure, the computer program product comprising: a computer readable storage medium having computer readable program code embodied therewith, the computer readable program code adapted to perform the method described above when said program is run on a computer.

BRIEF DESCRIPTION OF THE DRAWINGS

The following detailed description, given by way of example and not intended to limit the invention solely thereto, will best be appreciated in conjunction with the accompanying drawings, in which:

FIGS. 5 to 9 show table forms produced for the tables of the drawing of FIG. 3;

FIGS. 10 to 13 show foreign keys forms produced for the foreign keys of the drawing of FIG. 3.

DETAILED DESCRIPTION

Figures 1, 2:
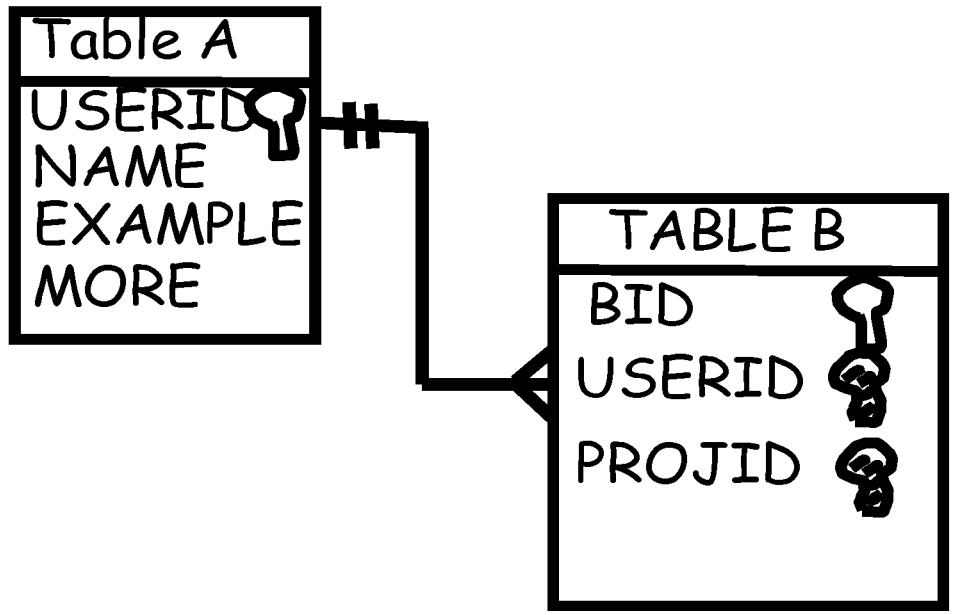
FIG. 1 shows a first drawing of a desired database structure suitable for use in embodiments of the present invention.
FIG. 2 shows a portion of a second drawing of a desired database structure suitable for use in embodiments of the present invention.

FIG. 1 shows a first drawing of a desired database structure suitable for use in embodiments of the present invention. The drawing is typically a hand-drawn drawing and thus may lack precision in the shapes and formatting and may have a non-blank background such as shading. The exemplary drawing represented in FIG. 1 shows a square shape at the left hand side joined by a line to a square shape at the right hand side. The square shapes represent entities in an Entity-Relationship model and the line represents a relationship in an Entity-Relationship model.

The left hand square has an upper portion separated by a line from a lower portion. Within the upper portion is the text "Table A". Text contained in the upper portion of a square is recognized as a title for that entity. Within the lower portion of the left hand square are four further lines of text, "USERID", "NAME", "EXAMPLE" and "MORE". Text contained in such lines in the lower portion is recognized as the names of columns of the desired database structure. The right hand square also has an upper portion separated by a line from a lower portion. Within the upper portion is the text "TABLE B". Text contained in the upper portion of a square is recognized as a title for that entity. Within the lower portion of the right hand square are three further lines of text, "BID", "USERID" and "PROJID". Text contained in such lines in the lower portion is recognized as the names of columns of the desired database structure. The line joining the squares has, at its left hand end, a single connection from the line of text "USERID" to, at its right hand end, a plurality of connections to the line of text "USERID". This indicates that the relationship represented by the line is a one-to-many relationship between the left hand square and the right hand square.

The first line, "USERID", of the four lines of text in the left hand square is followed by a key symbol, meaning that this column is to be used as a primary key for the table. Similarly, the first line, "BID", of the three lines of text in the right hand square is followed by a key symbol meaning that this column is to be used as a primary key for the table. The second, "USERID", and third, "PROJID", lines of the three lines of text in the right hand square are followed by a shaded key symbol, meaning that these columns are to be used as foreign keys.

Referring now to FIG. 2, which shows a portion of a second drawing of a desired database structure. This drawing is also a hand drawn drawing and lacks precision in the shapes and formatting and may have a non-blank shaded background. Optionally, the text in the lower portion of a square may be followed by an attribute comprising information, such as the type of data. Examples of the type of data are "TEXT", "INT" and "VARCHAR(64)". The second line, "INFO", of text in the square has an attribute of "TEXT" and the fourth line, "STATUS", of text in the square has an attribute of "INT". The first line of text, "METAID", is followed by a key symbol, meaning that column is to be used as a primary key for the table.

Figure 3:
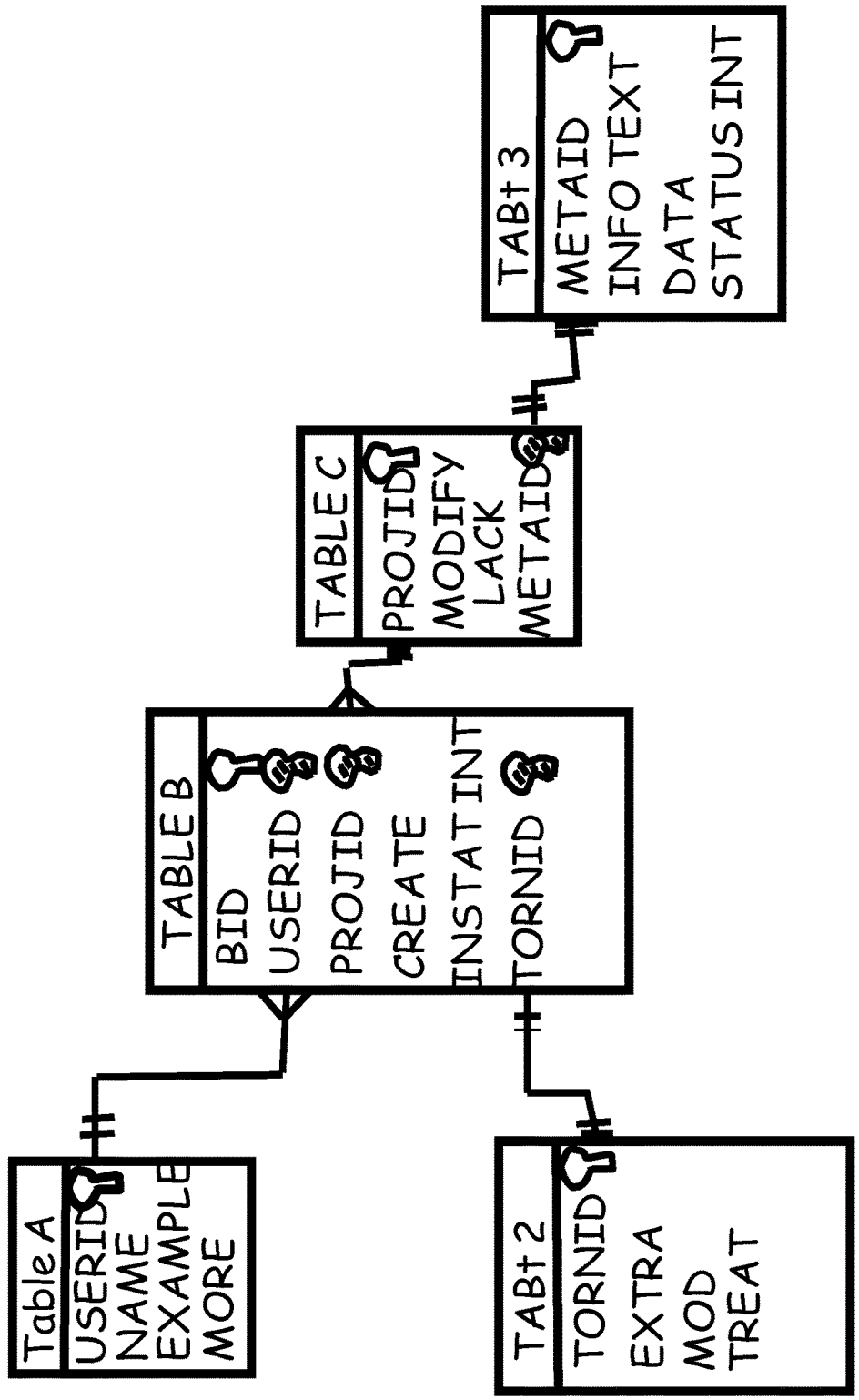
FIG. 3 shows the entirety of the second drawing of FIG. 2.

FIG. 3 shows the entirety of the second drawing of the desired database structure, a portion of which is shown in FIG. 2. Five tables, Table A, TABLE B, TABLE C, TABt 2 and TABt 3 are shown. Each of the tables has a Primary Key, shown by a key symbol following the text representing the column. Further TABLE C has one and TABLE B has three Foreign Keys, shown by a shaded key symbol following the text representing the column. The column "USERID" in Table A has a one-to-many relationship with the column "USERID" in TABLE B as does the column "PROJID" in TABLE C with the column "PROJID" in TABLE B. The column "METAID" in TABt 3 has a one-to-one relationship with the column "METAID" in TABLE C as does the column "TORNID" in TABt 2 with the column "TORNID" in TABLE B. Column "INSTAT" in TABLE B is of type int, as is column "STATUS" in TABt 3. Column "INFO" in table TABt 3 is of type text.

Figure 4:
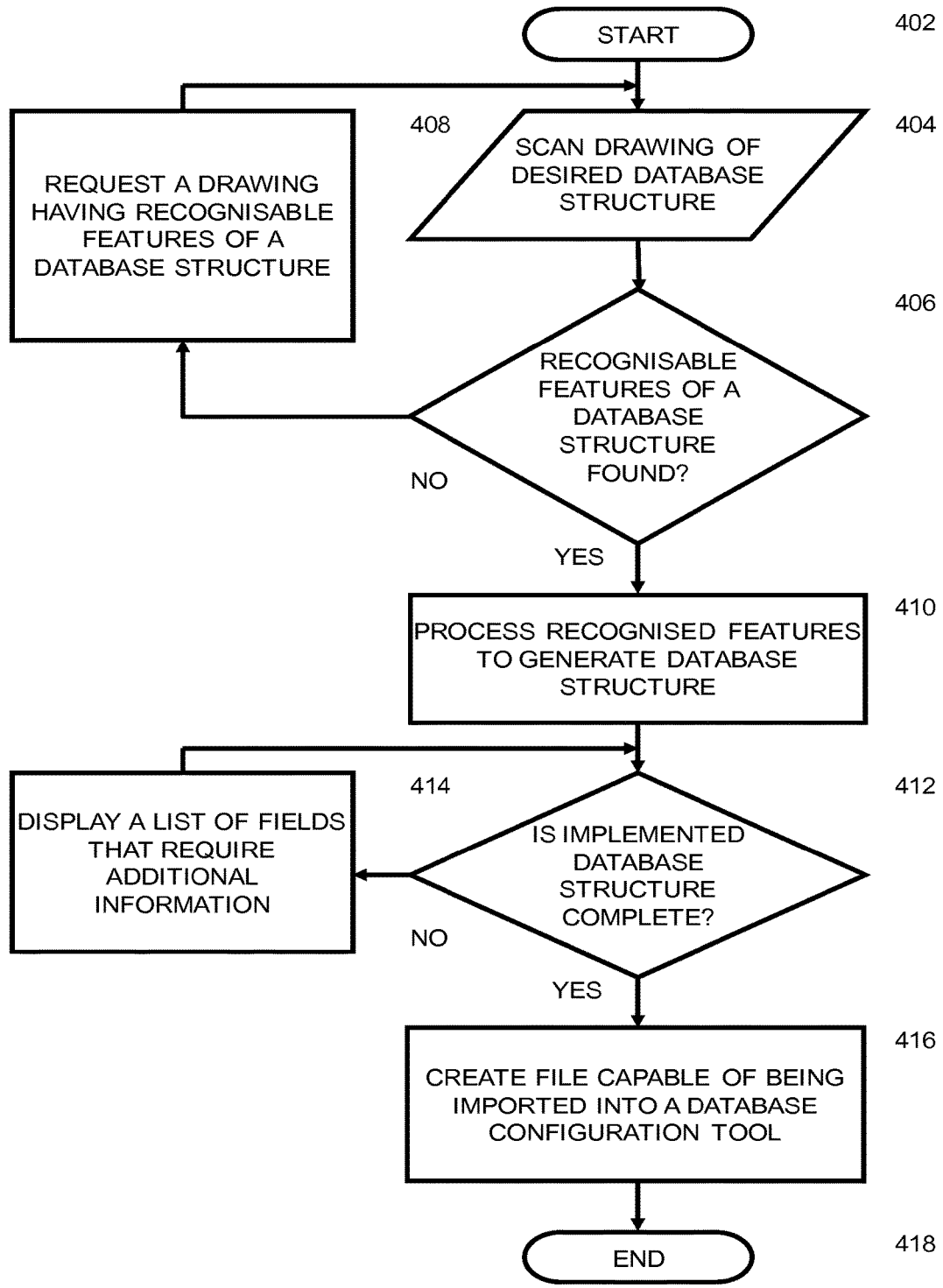
FIG. 4 shows a flow chart of a method according to an embodiment of the present invention.

FIG. 4 shows a flowchart of a method, according to an embodiment of the present invention. The method starts at step 402. At step 404, a drawing of the desired database structure is scanned. In a preferred embodiment, the scanned drawing is provided by other hardware and/or software to the method and system of the present invention. In other embodiments, the drawing is scanned as part of the present invention. At step 406, the scanned drawing is analyzed to determine whether recognizable features of a database structure are found. If no recognizable features of a database structure are found, then processing proceeds to step 408. At step 408, a user is requested to provide a scanned drawing having recognizable features of a database structure and processing returns to step 404. At step 406, if recognizable features of a database structure are found, then processing proceeds to step 410.

At step 410, the scanned drawing is processed to identify features of the desired database structure. The identified features are then implemented to generate the desired database structure. For each of the tables in the scanned drawing, a form is created, which will be explained further with reference to FIGS. 5-9. For each of the foreign keys in the scanned drawing, a form is created, which will be explained further with reference to FIGS. 10-13.

Referring to FIG. 5, a form is shown for TABLE C of FIG. 3. The form is pre-filled in with information from the scanned drawing. At the top of FIG. 5 is the table title of "TABLE C". Down the left hand side are the names of each of the columns "PROJID", "MODIFY", "LACK" and "METAID". Associated with each of the columns are tick boxes to indicate whether the column is a Primary Key (PK), a Foreign Key (FK) or whether the column is Auto Increment (AI). Also associated with each column is an indicator of the data type of the column, selected from a drop down list of data types. In the example of FIG. 5, column "PROJID" is a primary key for the table, is an auto increment column and of data type int. Columns "MODIFY" and "LACK" are not primary keys, foreign keys or auto increment columns and are not of a specified data type. These columns are not of a specified data type because the user did not specify one in the drawing. In an embodiment of the invention, the user is invited to indicate the data type of any columns which are not specified in the drawing. If the user does not indicate the data type, a default may be used. In an embodiment, the default data type may be "varchar(256)". Other embodiments may use other datatypes or may choose a datatype based on other factors, such as the name of the column. For example, "varchar(256)" may be used as a default for all columns except where "ID" or "Id" is contained within the column name in which case "int" is the default. Column "METAID" is a foreign key, is not an auto increment column and is of data type int. At the bottom of the form is shown a "Confirm" button used by a user to confirm the information in the table.

FIG. 6 shows a form for the TABt2 of FIG. 3. The form is pre-filled in with information from the scanned drawing. At the top of FIG. 6 is the table title of "TABt2 ". Down the left hand side are the names of each of the columns "TORNID", "EXTRA", MOD" and "TREAT". In the example of FIG. 6, column "TORNID" is a primary key for the table and is not of a specified data type. Columns "EXTRA", "MOD" and "TREAT" are not primary keys, foreign keys or auto increment columns and are not of a specified data type.

Figure 7:

FIG. 7 shows a form for the Table A of FIG. 3. The form is pre-filled in with information from the scanned drawing. At the top of FIG. 7 is the table title of "Table A". Down the left hand side are the names of each of the columns "USERID", "NAME", EXAMPLE" and "MORE". In the example of FIG. 7, column "USERID" is a primary key for the table, is an auto increment column and is not of a specified data type. Columns "NAME", "EXAMPLE" and "MORE" are not primary keys, foreign keys or auto increment columns and are not of a specified data type.

Figure 8:

FIG. 8 shows a form for the TABt3 of FIG. 3. The form is pre-filled in with information from the scanned drawing. At the top of FIG. 8 is the table title of "TABt3 ". Down the left hand side are the names of each of the columns "METAID", "INFO", "DATA" and "STATUS". In the example of FIG. 8, column "METAID" is a primary key for the table, is not an auto increment column and is not of a specified data type. Column "INFO" is not a primary key or a foreign key, is not an auto increment column and is of data type text. Column "DATA" is not; a primary key or a foreign key, an auto increment column, or of a specified data type. Column "STATUS" is not a primary key or a foreign key, is not an auto increment column and is of data type int.

FIG. 9 shows a form for the TABLE B of FIG. 3. The form is pre-filled in with information from the scanned drawing. At the top of FIG. 9 is the table title of "TABLE B". Down the left hand side are the names of each of the columns "BID", "USERID", "PROJID", "CREATE", "INSTAT" and "TORNID". In the example of FIG. 9, column "BID" is a primary key for the table, is not an auto increment column and is not of a specified data type. Columns "USERID", "PROJID" and "TORNID" are all foreign keys, not auto increment columns and are not of a specified data type. Column "CREATE" is not a primary key or a foreign key, is not an auto increment column and is not of a specified data type. Column "INSTAT" is not a primary key or a foreign key, is not an auto increment column and is of data type int.

FIG. 10 shows a form for the foreign key "METAID" of TABLE C. For each foreign key a search is made for primary keys with the same name. In the example of FIG. 10, a primary key of the same name is found in TABt3. This is displayed to the user in the form as a primary key. The user is asked to confirm that the foreign key is associated with this primary key. The user is also asked to add any extra relationships that have not been identified from the scanned drawing. In FIG. 10, this may be done by selecting the "Add another" option.

Figure 11:
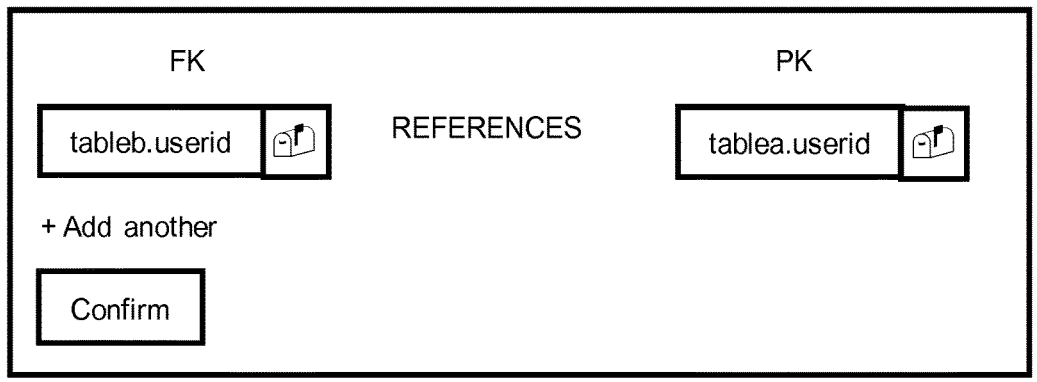
Figure 12:
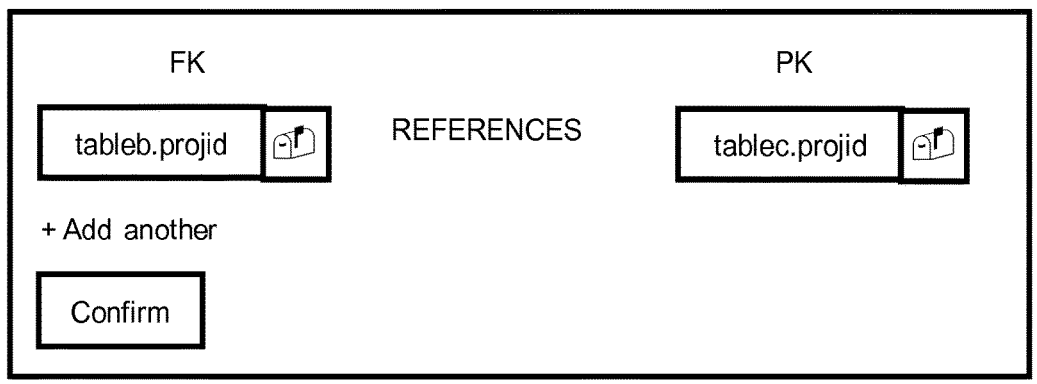
Figure 13:
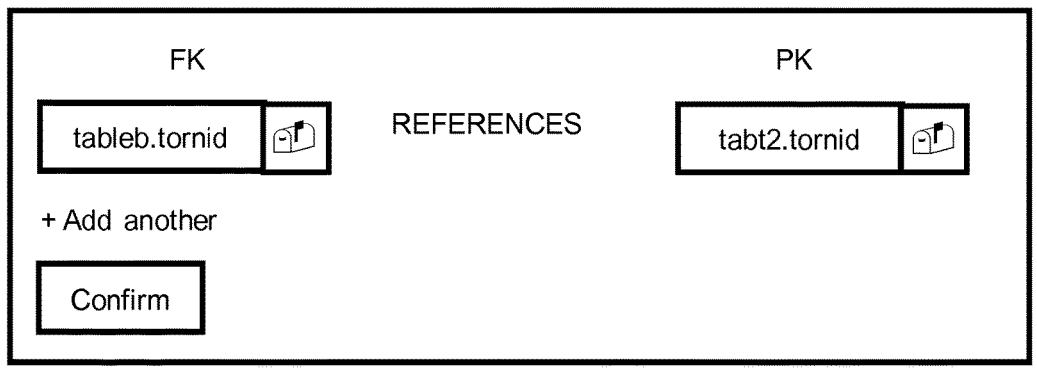

FIGS. 11 through 13 show the corresponding foreign key references for columns "USERID", "PROJID" and "TORNID" in TABLE B. For each of these the user is asked to confirm that the foreign key is associated with the primary key shown. The user is also asked to add any extra relationships that have not been identified from the scanned drawing. In FIGS. 11 to 13, this may be done by selecting the "Add another" option.

Returning to step 412 in FIG. 4, a check is made to determine whether the database structure is functional without further information. In an embodiment, this check may include checking that each table has a name and that each foreign key, if any, is associated with a primary key in a column in another table. If the database structure is not functional without further information, then processing proceeds to step 414. At step 414, a list of columns that require additional information to complete the database structure is displayed to the user. In an embodiment, the display to the user may be using the forms of FIGS. 5 to 9 and FIGS. 10 to 13. Processing then returns to step 412. If the database structure is functional without further information, then processing proceeds to step 416.

At step 416, a file is created, from the database structure, the file being capable of being imported into a database configuration tool, such as phpMyAdmin, mysql workbench or the like.

An example of the output produced from processing the form of FIG. 5 for the table "TABLE C" and the form of FIG. 10 for the foreign key "METAID" might be:

```
-- Table structure for table 'TABLEC'
--
    'PROJID' INT(5) AUTO_INCREMENT,
    'MODIFY' DATE,
    'LACK' VARCHAR(256),
    'METAID' INT(5),
    PRIMARY KEY ('PROJID')
) ENGINE=InnoDB DEFAULT CHARSET=latin1
AUTO_INCREMENT=0;|
--
-- Constraints for table 'TABLEC'
--
ALTER TABLE 'TABLEC'
    ADD CONSTRAINT 'tablec_ibfk_1' FOREIGN KEY ('METAID')
REFERENCES 'TABT3' ('METAID') ON DELETE NO ACTION
ON UPDATE NO ACTION:
```

In the example above, PROJID and METAID are shown as type int(5). The user's drawing indicated that these columns are of type int. In an embodiment, the choice of int(5) may come from the user selecting a length of 5 when confirming the information on the form of FIG. 5. In another embodiment, a length of 5 may be a default length when a column name contains the term ID, indicating that it is an identifier. Other portions of column names and other lengths may be used. The user has selected "date" as the data type for the column MODIFY. The data type of varchar(256) has been used for LACK as the default data type. Other default data types and lengths may be used for these or for other column names.

InnoDB is a storage engine for MySQL and inclusion of ENGINE=InnoDB documents this. The inclusion of DEFAULT CHARSET=latin1 also identifies the default character set. The inclusion of "AUTO_INCREMENT=0" indicates that unless otherwise specified, all columns are not Auto Increment.

The constraint for table TABLEC indicates that there is a foreign key in table C. The constraint is identified as tablec_ibfk1, indicating that it is associated with table C and that it is an InnoDB foreign key. The foreign key METAID references the primary key METAID in table TABt3. The ON DELETE NO ACTION ON UPDATE NO ACTION: portion indicates choices that should be made in the event that the foreign key is deleted or updated.

The method ends at step 418.

An example of the output produced from processing the form of FIG. 6 for the table "TABt2 " might be:

```
-- Table structure for table 'TABt 2'
--
    'TORNID' INT(5),
    'EXTRA' VARCHAR(256),
    'MOD' VARCHAR(256),
    'TREAT' VARCHAR(256),
    PRIMARY KEY ('TORNID')
) ENGINE=InnoDB DEFAULT CHARSET=latin1
AUTO_INCREMENT=0;|
```

The default data type for a column name including (or ending in) ID of int has been used for the column TORNID. Either the user has chosen, or the default length of 5 has been used. Other default data types and lengths may be used for other column names including, starting or ending in various combinations of characters. The default data type of varchar (256) has been used for the columns EXTRA, MOD and TREAT. Other default data types and lengths may be used for these or for other column names.

An example of the output produced from processing the form of FIG. 7 for the table "Table A" might be:

```
-- Table structure for table 'Table A'
--
    'USERID' INT(5), AUTO_INCREMENT,
    'NAME' VARCHAR(256),
    'EXAMPLE' VARCHAR(256),
    'MORE' VARCHAR(256),
    PRIMARY KEY ('USERID')
) ENGINE=InnoDB DEFAULT CHARSET=latin1
AUTO_INCREMENT=0;|
```

An example of the output produced from processing the form of FIG. 8 for the table "TABt3 " might be:

```
-- Table structure for table 'TABt 3'
--
    'METAID' INT(5),
    'INFO' TEXT,
    'DATA' VARCHAR(256),
    'STATUS' INT(5),
    PRIMARY KEY ('METAID')
) ENGINE=InnoDB DEFAULT CHARSET=latin1
AUTO_INCREMENT=0;|
```

An example of the output produced from processing the form of FIG. 9 for the table "TABLE B" and the forms of FIGS. 11 to 13 for the foreign keys "USERID", "PROJID" and "TORNID" might be:

```
-- Table structure for table 'TABLEB'
--
    'BID' INT(5),
        'USERID' INT(5),
        'PROJID' INT(5),
        'CREATE' VARCHAR(256),
        'INSTAT' INT(5),
        'TORNID' INT(5),
        PRIMARY KEY ('BID')
) ENGINE=InnoDB DEFAULT CHARSET=latin1
AUTO_INCREMENT=0;|
--
-- Constraints for table 'TABLEB'
--
ALTER TABLE 'TABLEB'
    ADD CONSTRAINT 'tableb_ibfk_1' FOREIGN KEY ('USERID')
REFERENCES 'TABLEA' ('USERID') ON DELETE NO ACTION ON
UPDATE NO ACTION:
    ADD CONSTRAINT 'tableb_ibfk_2' FOREIGN KEY ('PROJID')
REFERENCES 'TABLEC' ('PROJID') ON DELETE NO ACTION ON
```

-continued

```
UPDATE NO ACTION:
    ADD CONSTRAINT 'tableb_ibfk_3' FOREIGN KEY ('TORNID')
REFERENCES 'TABt 2' ('TORNID') ON DELETE NO ACTION ON
UPDATE NO ACTION:
```

Figure 14:
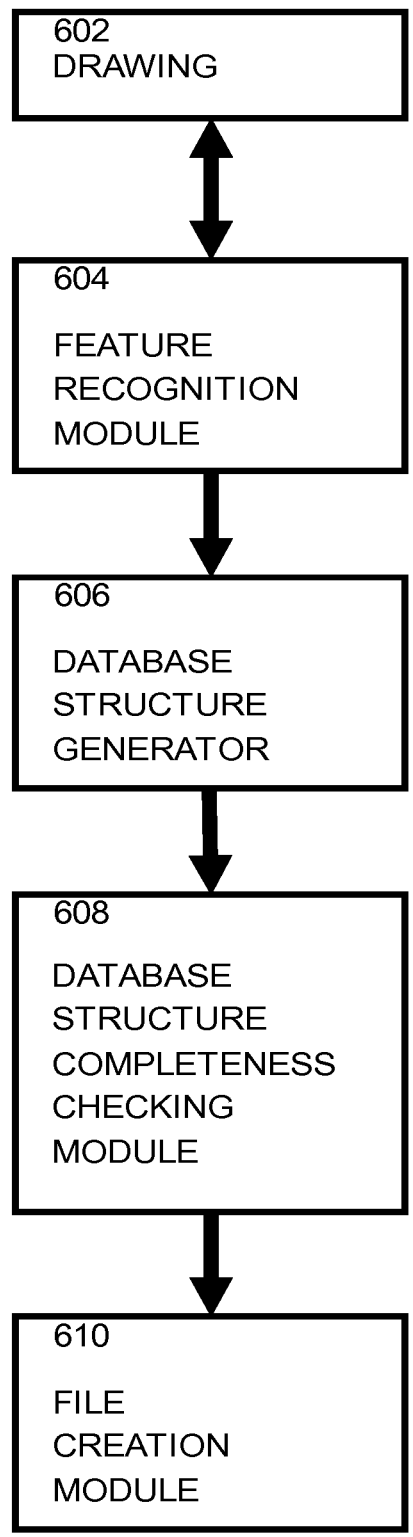
FIG. 14 shows a system according to an embodiment of the present invention.

Referring to FIG. 14, a system according to an embodiment of the present invention is shown. Feature recognition module 604 receives drawing 602. In a preferred embodiment, the scanned drawing 602 is provided by other hardware and/or software to the system of the present invention. In other embodiments, the drawing 602 is scanned as part of the system of the present invention. The feature recognition module 604 analyzes drawing 602 to determine whether recognizable features of a database structure are found. If no recognizable features of a database structure are found, then the feature recognition module 604 requests a user to provide a scanned drawing 602 having recognizable features of a database structure. If recognizable features of a database structure are found, then the feature recognition module transmits the drawing 602 to database structure generator 606. Database structure generator 606 processes the drawing 602 to identify features of the desired database structure and then implements them to generate the desired database structure. The database structure is then transmitted to database structure completeness checking module 608 which checks that the database structure is complete. If the database structure is not functional without further information being required, then the database structure completeness checking module 608 requests further information to complete the database structure. In an embodiment, this information is requested by displaying to a user a list of columns that require further information to complete the database structure. If the database structure is functional without further information being required, then the database structure completeness checking module 608 transmits the database structure to file creation module 610. File creation module 610 then creates a file capable of being imported into a database configuration tool. In an embodiment, the file that is created comprises sql code. In an embodiment, the database configuration tool is the IBM Data Studio or phpMyAdmin.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted, some of the described embodiments of the invention provide the advantage of improving the speed at which teams create databases in database programs and therefore make the development process more efficient and quicker.

What is claimed is:

1. A computer implemented method of improving a speed at which a database is created by generating a database structure from a scanned drawing of a desired database structure, the method comprising:
    capturing a hand-drawn image using an image capturing device, wherein the hand-drawn image lacks precision in shapes and formatting;
    determining, without a user intervention by a feature recognition module, whether the captured hand-drawn image has recognizable features of a database structure, wherein the feature recognition module is a computer program for generating the database structure from the captured hand-drawn image of a desired database structure;
    in response to the captured hand-drawn image having recognizable features of a database structure, generating, without the user intervention by a database structure generator, a database that exhibits the recognizable features;
    determining, without the user intervention, whether the database structure is functional without further information, wherein the determining whether the database structure is functional based on checking that each table of the database structure has a name and that each foreign key of the each table is associated with a primary key in a column in an another table of the database structure; and
    requesting further information to complete the database structure, in response to a determination of a non-functional database structure, wherein requesting the further information includes displaying a list of columns of the database structure that require additional information to complete the database structure on a user interface.

2. The method of claim 1, wherein processing the scanned drawing includes a determination of whether the scanned drawing has recognizable features of a database structure.

3. The method of claim 2, further comprising:
    requesting the scanned drawing having recognizable features of a database structure, in response to a determination of unrecognizable features of a database structure.

4. The method of claim 1, further comprising:
    creating a file from the database structure, wherein the file is capable of being imported into a database configuration tool.

5. A system for improving a speed at which a database is created by generating a database structure from a scanned drawing of a desired database structure, the system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    capturing a hand-drawn image using an image capturing device, wherein the hand-drawn image lacks precision in shapes and formatting;
    determining, without a user intervention by a feature recognition module, whether the captured hand-drawn image has recognizable features of a database structure, wherein the feature recognition module is a computer program for generating the database structure from the captured hand-drawn image of a desired database structure;
    in response to the captured hand-drawn image having recognizable features of a database structure, generating, without the user intervention by a database structure generator, a database that exhibits the recognizable features;
    determining, without the user intervention, whether the database structure is functional without further information, wherein the determining whether the database structure is functional based on checking that each table of the database structure has a name and that each foreign key of the each table is associated with a primary key in a column in an another table of the database structure; and
    requesting further information to complete the database structure, in response to a determination of a non-functional database structure, wherein requesting the further information includes displaying a list of columns of the database structure that require additional information to complete the database structure on a user interface.

6. The system of claim 5, wherein processing the scanned drawing includes a determination of whether the scanned drawing includes recognizable features of a database structure.

7. The system of claim 6, wherein processing the scanned drawing includes requesting a scanned drawing having recognizable features of a database structure, in response to a determination that the scanned drawing does not include recognizable features of a database structure.

8. The system of claim 5, further comprising:
 determining whether the database structure is functional without further information.

9. The system of claim 5, further comprising:
 creating a file from the database structure, wherein the file is capable of being imported into a database configuration tool.

10. A computer program product for improving a speed at which a database is created by generating a database structure from a scanned drawing of a desired database structure, the computer program product comprising:
 one or more computer-readable storage media and program instructions stored on the one or more computer-readable storage media capable of performing a method, the method comprising:
  capturing a hand-drawn image using an image capturing device, wherein the hand-drawn image lacks precision in shapes and formatting;
  determining, without a user intervention by a feature recognition module, whether the captured hand-drawn image has recognizable features of a database structure, wherein the feature recognition module is a computer program for generating the database structure from the captured hand-drawn image of a desired database structure;
  in response to the captured hand-drawn image having recognizable features of a database structure, generating, without the user intervention by a database structure generator, a database that exhibits the recognizable features;
  determining, without the user intervention, whether the database structure is functional without further information, wherein the determining whether the database structure is functional based on checking that each table of the database structure has a name and that each foreign key of the each table is associated with a primary key in a column in an another table of the database structure; and
  requesting further information to complete the database structure, in response to a determination of a nonfunctional database structure, wherein requesting the further information includes displaying a list of columns of the database structure that require additional information to complete the database structure on a user interface.

11. The computer program product of claim 10, wherein the program instructions to process the scanned drawing includes determining whether the database structure includes recognizable features of a database structure.

12. The computer program product of claim 11, wherein the program instructions to process the scanned drawing includes requesting a scanned drawing having recognizable features of a database structure, in response to a determination of unrecognizable features of a database structure.

13. The computer program product of claim 10, further comprising:
 program instructions to determine whether the database structure is functional without further information.

14. The computer program product of claim 10, wherein the program instructions to request further information includes a display on a user interface of a list of columns of the database structure that require additional information.

15. The computer program product of claim 10, further comprising:
 program instructions to create a file from the database structure, wherein the file is capable of being imported into a database configuration tool.

* * * * *